United States Patent [19]

Chen

[11] Patent Number: 4,758,955
[45] Date of Patent: Jul. 19, 1988

[54] HAND-HELD SPELLING CHECKER AND METHOD FOR REDUCING REDUNDANT INFORMATION IN THE STORAGE OF TEXTURAL MATERIAL

[76] Inventor: Carson Chen, 2330 Oakmont Dr., San Bruno, Calif. 94066

[21] Appl. No.: 757,041

[22] Filed: Jul. 19, 1985

[51] Int. Cl.⁴ .......................... G06F 15/38; G06F 5/00
[52] U.S. Cl. ........................... 364/419; 340/347 DD; 364/900
[58] Field of Search ............... 364/419, 200 MS File, 364/900 MS File; 340/347 DD; 358/260

[56] References Cited

U.S. PATENT DOCUMENTS

| | | | |
|---|---|---|---|
| 4,417,319 | 11/1983 | Morimoto et al. | 364/900 |
| 4,494,150 | 1/1985 | Brickman et al. | 358/260 |
| 4,503,514 | 3/1985 | Urguhart | 364/900 |
| 4,545,032 | 10/1985 | Mak | 364/900 |
| 4,558,302 | 12/1985 | Welch | 340/347 DD |
| 4,597,057 | 6/1986 | Show | 364/900 |

FOREIGN PATENT DOCUMENTS 8501814  4/1985  PCT Int'l Appl.

OTHER PUBLICATIONS

Cubit Article, *Computer Shopper*, Mar. 1987, 196, 200.
Convis, D. B., "Reversible Dictionary Compression by Reference to Redundant Components of Vocabulary", *IBM Tech. Discl. Bull.*, vol. 24, No. 8, Jan. 1982, 4133-5.

Primary Examiner—Jerry Smith
Assistant Examiner—Clark A. Jablon
Attorney, Agent, or Firm—Townsend and Townsend

[57] ABSTRACT

A hand-held spelling checker is disclosed employing a compact technique for storing information. A binary character code is assigned to each letter of the alphabet, and an additional series of binary codes are assigned to indicate a relationship between a subsequent letter and a preceding letter in a dictionary entry. For each letter in the dictionary, the sum of the codes of the binary character and its relationship with the preceding is stored in memory.

21 Claims, 6 Drawing Sheets

FIG._2.

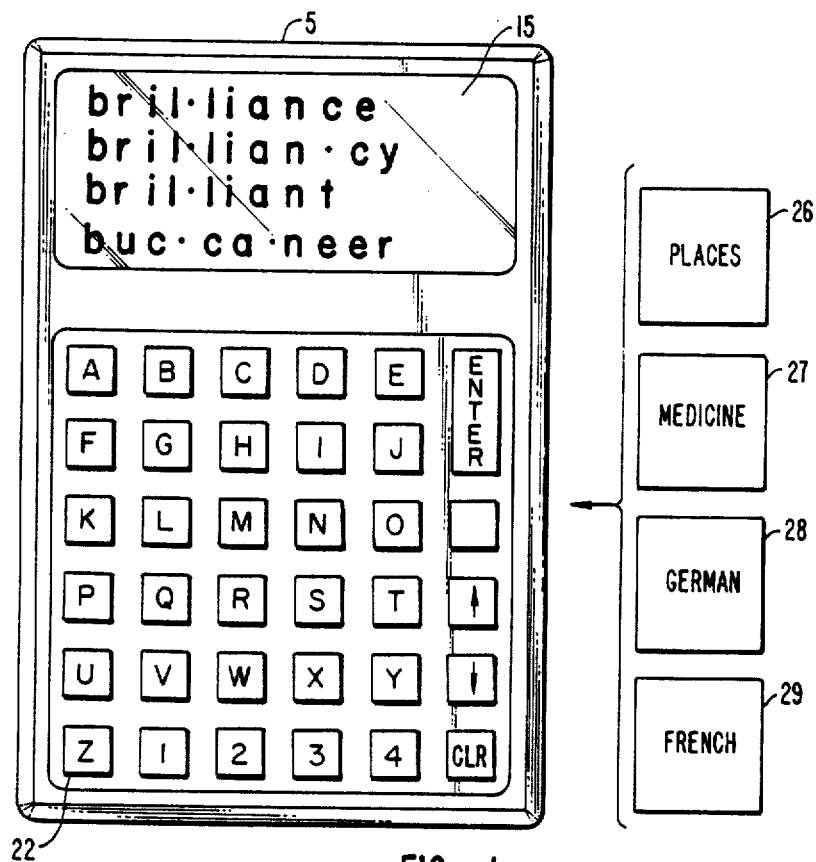
FIG._1.
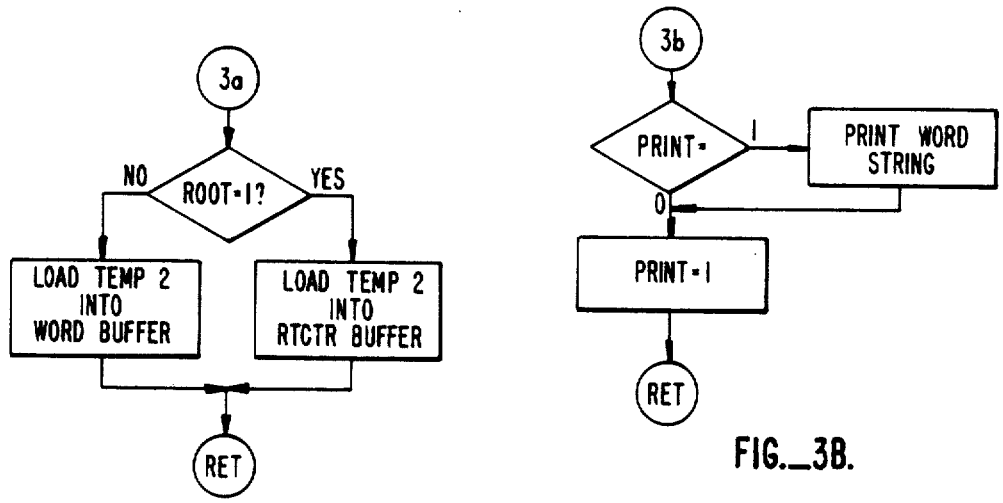
FIG._3A.
FIG._3B.

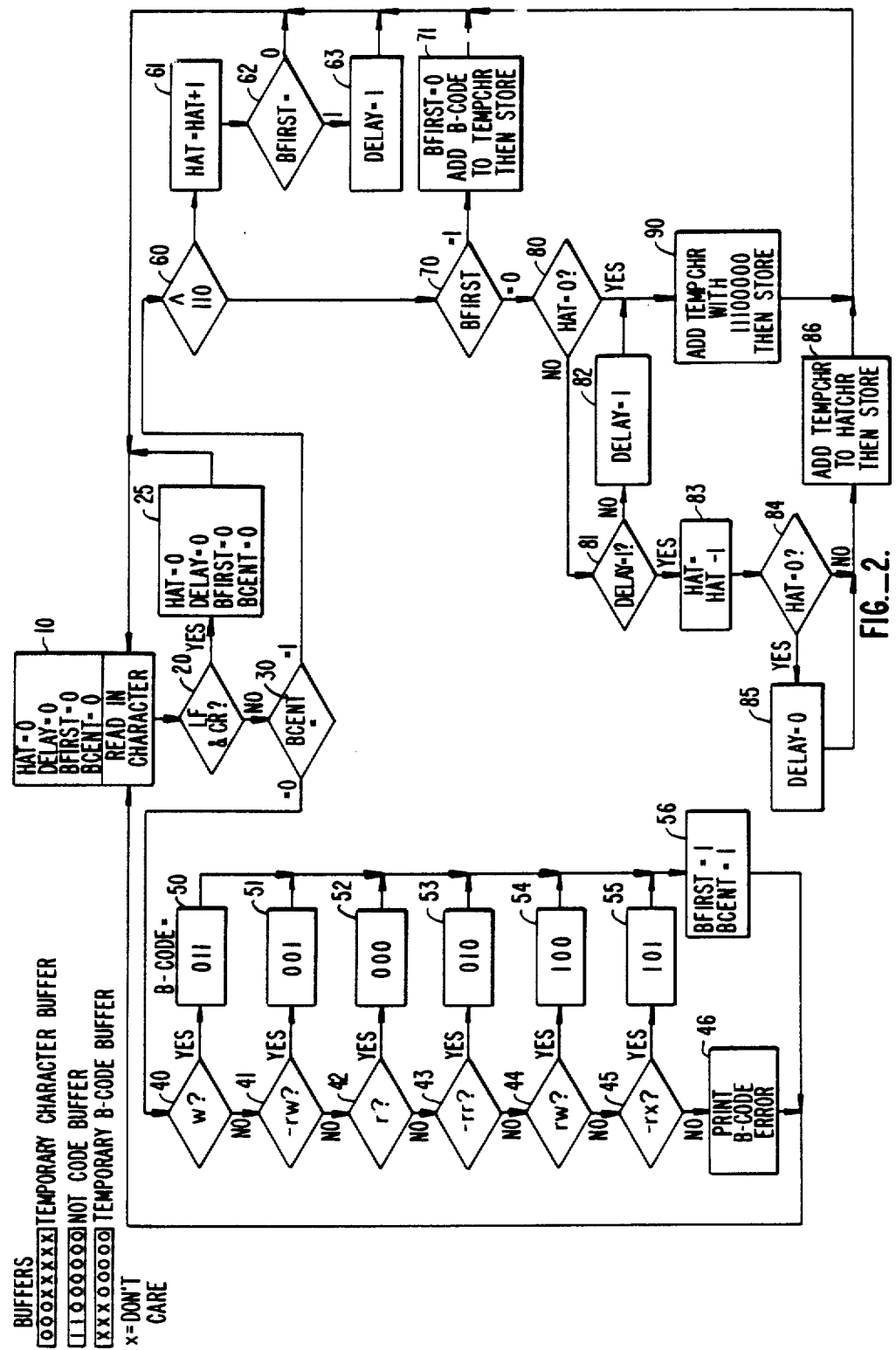
FIG._2.

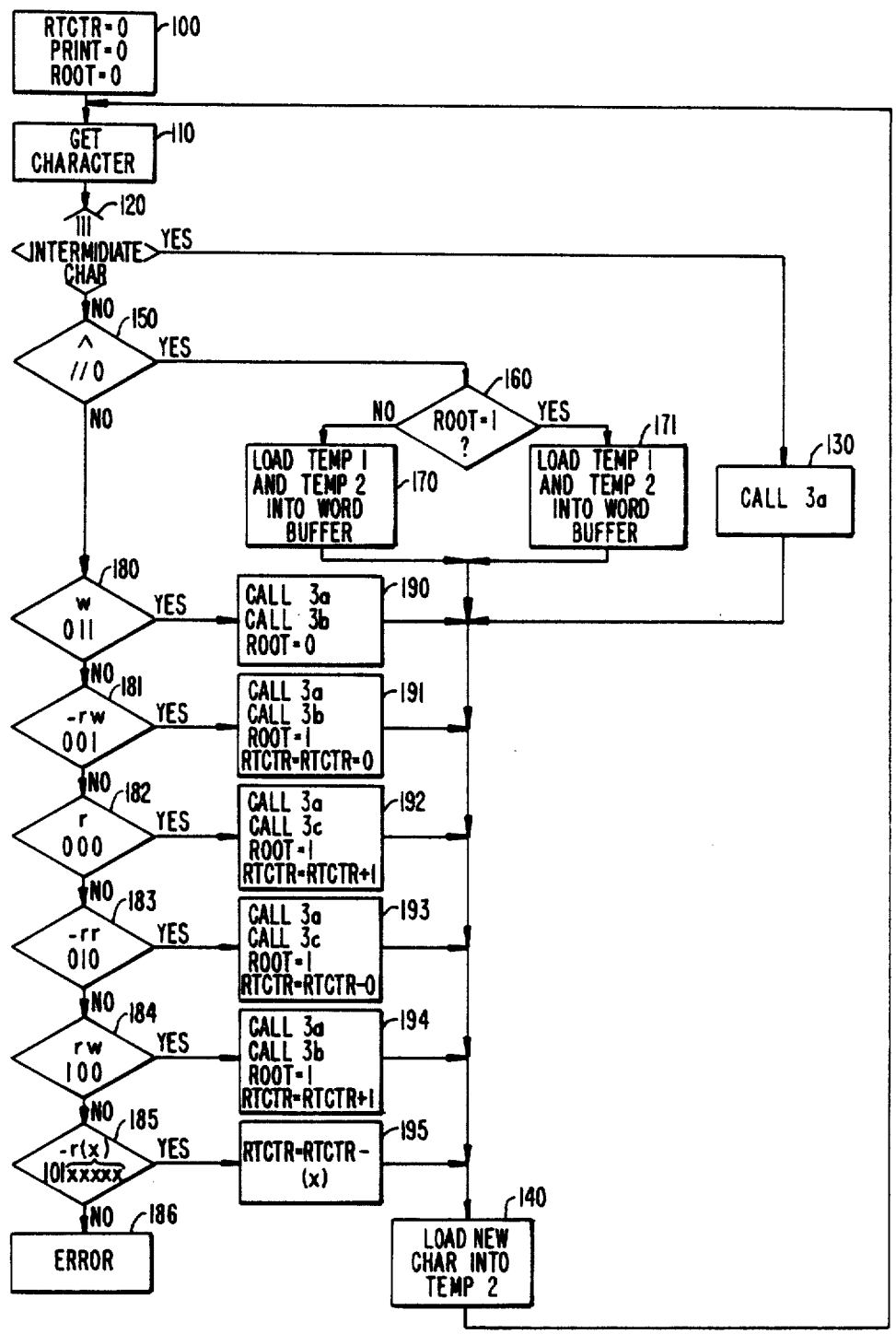
FIG._3.

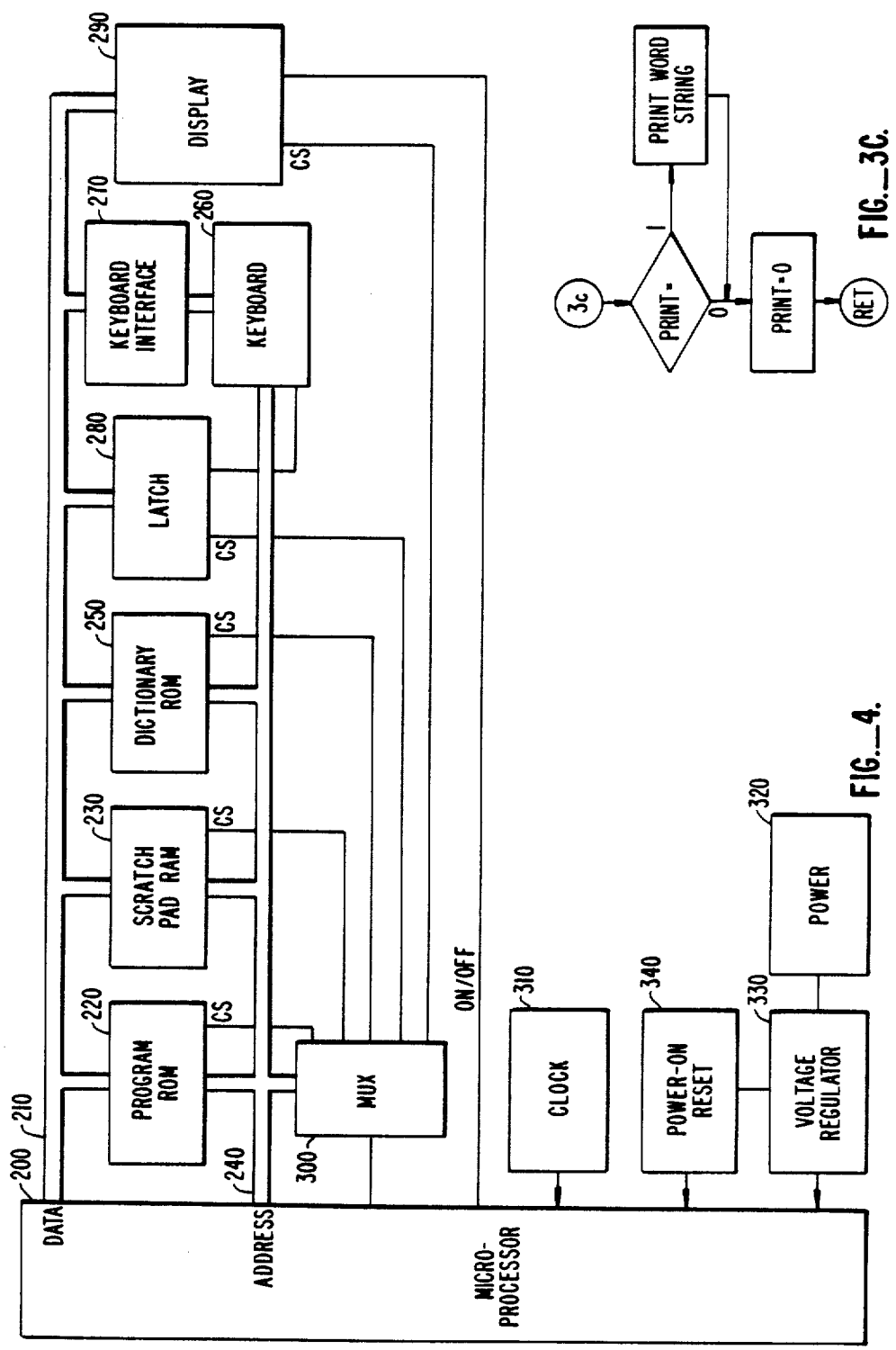

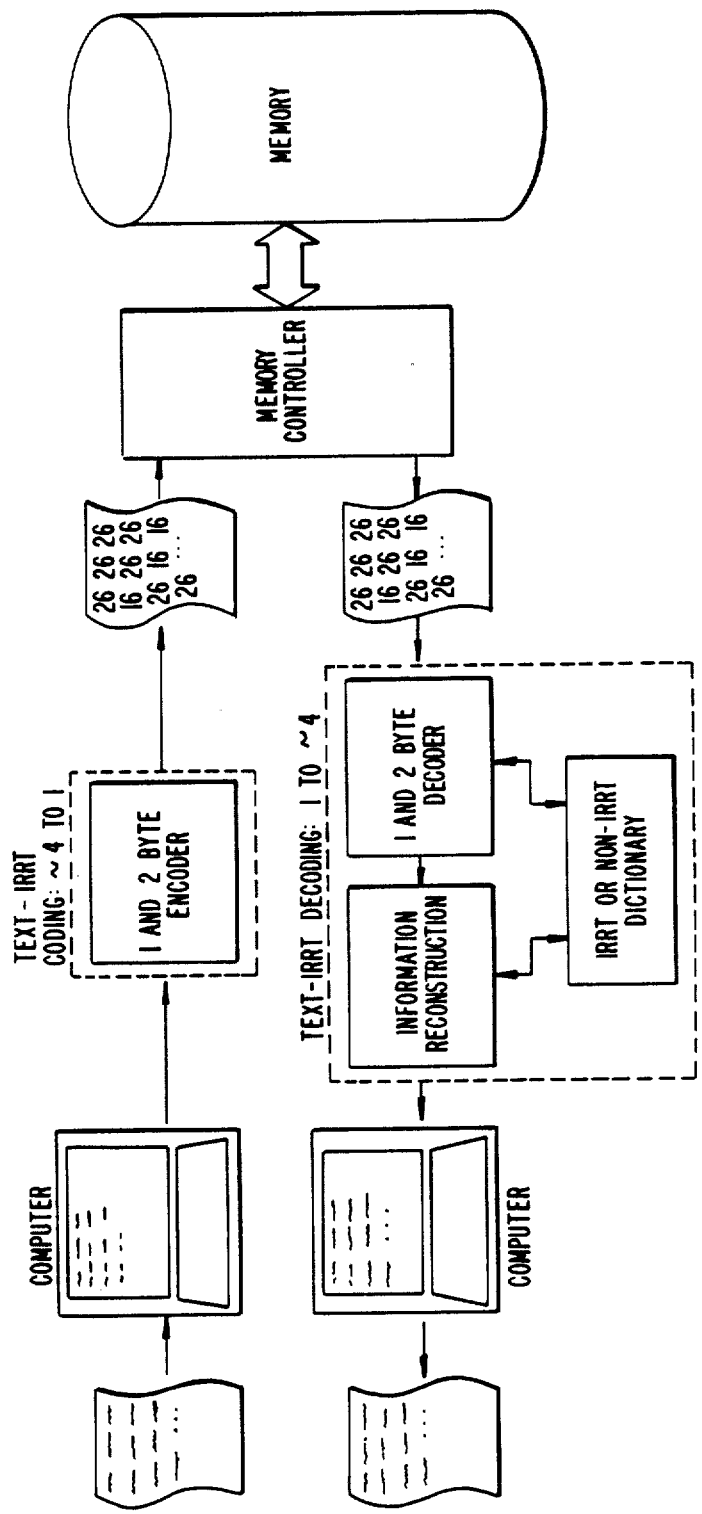
FIG._5.

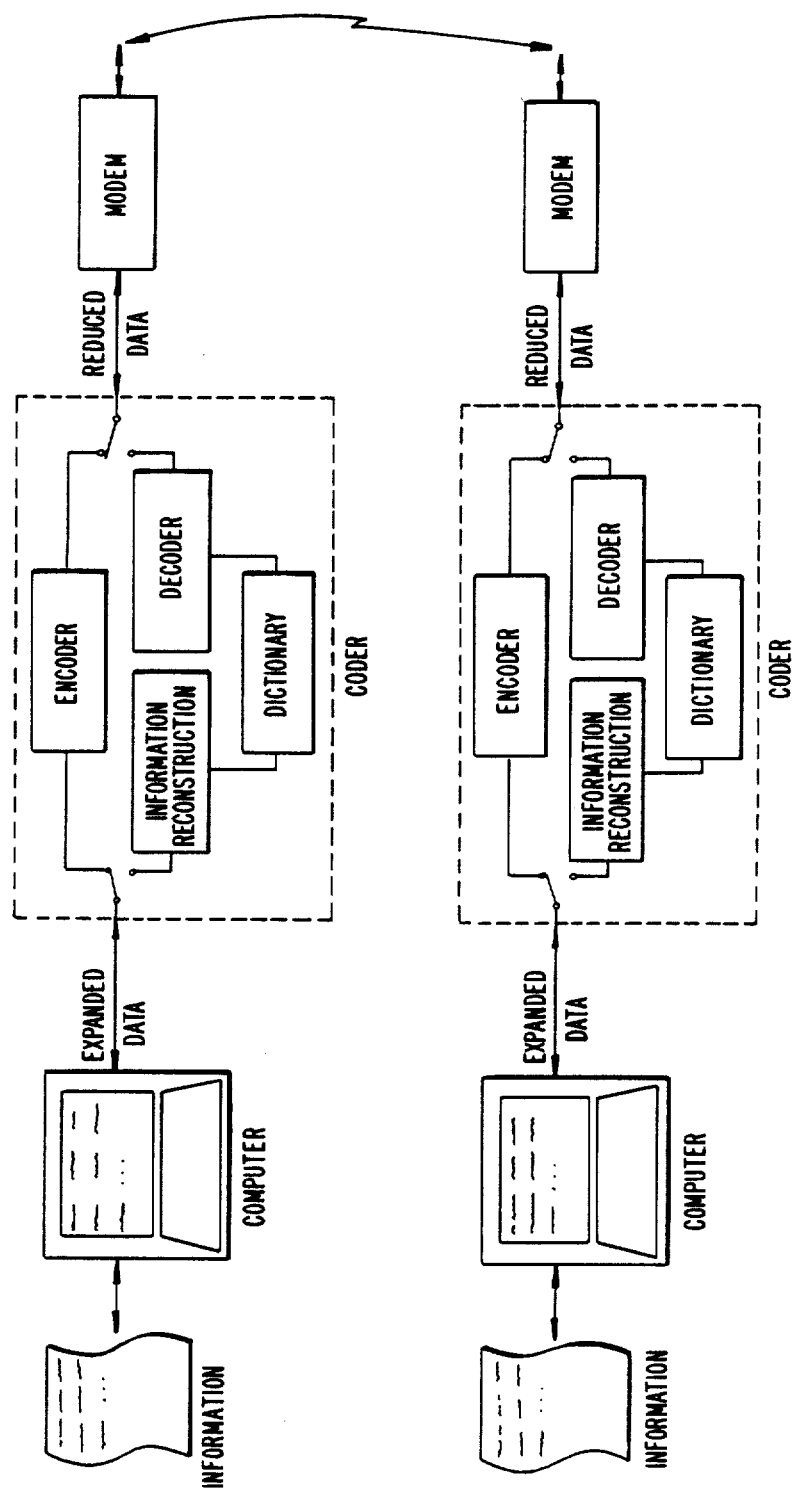
FIG._6.

HAND-HELD SPELLING CHECKER AND METHOD FOR REDUCING REDUNDANT INFORMATION IN THE STORAGE OF TEXTURAL MATERIAL

BACKGROUND OF THE INVENTION

1. Field of the Invention

This invention relates to a hand-held spelling checker capable of storing a large vocabulary in a minimum amount of memory space, and to a method of reducing redundancy in storing information in such a device.

2. Description of the Relevant Literature

Methods of providing spelling checking assistance for typists, word processors, and others, currently divide into two groups. The first technique is use of well-worn pocket or desk dictionaries to manually inquire into the spelling of words. The disadvantages of this approach are numerous. Only about a hundred words are listed on each page, with the result that hundreds of pages are necessary to store even a small dictionary of frequently used words. Spelling dictionaries overcome this difficulty to some extent because omission of the definitions allows a substantial compaction in the volume of information stored. Whether of a conventional or spelling variety, however, manual dictionaries cause a typist or word processor to interrupt his or her work, pick up a book, then leaf through the book to determine the proper spelling of the word sought.

In word processing applications, some of these disadvantages are overcome by the use of computerized spelling checkers. After entering a document into a word processor, an operator who desires to check the spelling of all words in that document typically inserts a floppy disk "dictionary" upon which words have been stored, and causes the system to compare each word in the document with the words in the floppy disk "dictionary" to check their spelling. Misspelled words are highlighted and the operator is given the opportunity to correct them. Because the words are stored in their entirety, one or more floppy disks are required to store the entire dictionary. The dictionary typically consumes so much random access memory when it is operating to preclude use of the word processing equipment for other purposes. In view of the large amount of memory required, the construction of hand-held or portable checkers has not been feasible.

SUMMARY OF THE INVENTION

This invention provides an exceptionally compact technique for storing information to enable the construction of portable hand-held spelling checkers for use by typists, as well as exceptionally compact spelling checkers for use by word processing operators without undesirably consuming large amounts of random access memory or disk space. The invention enables the storage of spelling dictionaries in approximately one-fifth the memory space previously required to store the data using conventional methods.

A central feature of the invention is the use of codes in the storage of the dictionary words to represent the information redundant from one word to the subsequent word. These codes are termed "b-codes" and designate the relationship of a subsequent dictionary word entry to the preceding word entry. Each letter in the dictionary is encoded using a 5-bit binary character code. These five bits form the least significant bits of an 8-bit binary word, in which the three most significant bits form the b-code. The b-code indicates whether the following character is an intermediate character, whether it is preceded by a syllabic break, whether with the addition of the following character a dictionary word is created, etc. In this manner the spelling dictionary may be stored in extremely compact technique.

In a preferred embodiment, a method of storing a dictionary of words, made up a letters in an alphabet, compactly in an electronic memory includes the steps of assigning a different binary character code to each letter of the alphabet, providing an additional series of binary codes indicative of a relationship between a subsequent letter and a preceding letter in a dictionary entry, and for each letter in the dictionary of words, sequentially storing the sum of the codes of the two preceding steps in the electronic memory.

BRIEF DESCRIPTION OF THE DRAWINGS

FIG. 1 is a top view of an exemplary embodiment of a hand-held spelling checker using this invention;

FIG. 2 is a flowchart illustrating the preferred embodiment for a encoding vocabulary in a highly compact manner;

FIGS. 3 and 3A thru 3C are flowcharts of a method for reconstructing the compactly stored information; and FIG. 4 is a block diagram of one embodiment of an electrical circuit used to carry out the methods of FIGS. 2 and 3.

FIG. 5 shows a two-byte encoding and decoding scheme.

FIG. 6 is a data reduction encoder.

DETAILED DESCRIPTION OF OF THE PREFERRED EMBODIMENTS

FIG. 1 is a top view of a hand-held spelling checker which may be fabricated in the manner of the preferred embodiment described herein. As shown in FIG. 1 the unit includes a case 5, a display 15, and a keyboard 22. It may also include a series of memory modules 26–29. The operation of the spelling checker is described in detail below; however, in general the user will enter through keyboard 22 his or her best guess as to the first one or more letters of the word for which he wishes to obtain the correct spelling. In response, words of spelling similar to the letters entered on keyboard 22 are displayed on display 15. Using keys on the keyboard 22, the user is then able to scroll up or down the list of words displayed. Interchangeable read-only memories 26–29 allow the spelling checker to employ other special purpose "dictionaries" in place of English.

A primary feature of the invention, and one which enables it to store information substantially more compactly than prior art techniques, is the manner by which redundant information is removed from the dictionary at the time the vocabulary words are stored. Each entry in the dictionary will have an initial piece of information which reflects the relationship of that entry to the preceding one. This piece of information is referred to herein as "b-code". The b-code is used to eliminate much of the redundant information presently found in dictionaries. For example, a series of entries in the dictionary may end with the word "brilliancy." Using the b-code, the word "brilliant" may then be encoded by a few bits of information indicative of dropping the last syllable, "cy," followed by another few bits of information indicative of adding the letter "t." In this manner once the word "brilliancy" has been stored, the word "brilliant" will require only an additional small amount of information to be stored, typically only a single byte, thereby enabling both words to be stored in substantially less memory than permitted by prior art techniques. Of course, "brilliancy" itself may have been stored in a similar manner, reflecting modifications of the word "bright," etc. In a preferred embodiment of the invention, b-codes are employed which indicate that following information is an intermediate character of a word being stored, that a syllabic break is present, that the information stored is a word in the vocabulary of that dictionary, as well as other codes which are explained below. An example of the manner of storage is first given, followed by description of the methods of encoding and decoding the vocabulary words. Finally, an exemplary embodiment of the technique in a hand-held spelling checker is described.

AN EXAMPLE

The following is an example of the manner of operation of the spelling checker. Assume that one wishes to store the vocabulary list of Table A. Using the b-code of Table C in the manner described below, the information of Table A may be stored in the memory of the spelling checker in the compact form shown in Table B. Table B, by reducing the amount of redundant information in Table A, provides an almost 70% reduction of memory space required to store the information. The substantial reduction allows the information to be stored in solid state memory devices, such as ROMs, EPROMs, and the like. The manner by which Table B is created is discussed below.

TABLE A 1. fa·ble
2. fa·bled
3. fab·ric
4. fab·ri·cate
5. fab·ri·cat·ed
6. fab·ri·cat·ing
7. fab·ri·ca·tion
8. fab·ri·ca·tive
9. fab·ri·ca·tor
10. fab·u·lous
11. fab·u·lous·ly
12. fab·u·lous·ness
13. fa·cade
14. fa·cades
15. face
16. faced
17. fac·ing
18. fac·et

TABLE B r f
   r a
1. rw ʌ ble
2. w d
   −rr b
   r ʌ ri
3. w c
   r ʌ ca
   r t
4. w e
5. w ʌ ed
6. w ʌ ing
   −rr ʌ ti
7. w on
8. w ve
9. −rw ʌ tor
   −r3
10. rw ʌ u ʌ lous
11. w ʌ ly

TABLE B-continued 12. w ʌ ness
   −r2
13. rw ʌ cade
14. w s
   −rr c
15. rw e
16. w d
17. −rw ʌ ing
18. −rw ʌ et

Vocabulary Redundancy Reduction and Storage

Each b-code, as well as each character in a vocabulary word, is stored as an 8-bit binary word or byte. The first 3-bits of the 8-bit word are reserved for the b-code described in Table C and the remaining 5-bits contain the character information. For example, the word "fabled" can be stored once "fable" is stored by storing "w d" representative of adding a "d" to make a new word.

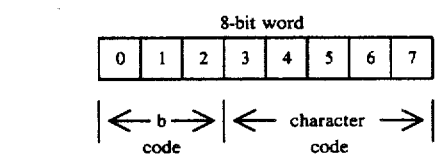

It is a matter of choice to select an appropriate b-code or character representation. For this example the b-code and character code of Tables C and D, respectively, have been chosen.

TABLE C

Exemplary b-Code List

| Binary | Decimal | Mnemonic | Interpretation |
|---|---|---|---|
| 111 | 7 |   | The character is an intermediate character |
| 110 | 6 | ʌ | A syllabic break |
| 011 | 3 | w | With the addition of the character a vocabulary word is created |
| 100 | 4 | rw | The character(s) is (are) a "root" character and completes a word |
| 001 | 1 | −rw | Delete the root buffer, add the character(s) and the remainder is both a word and a root |
| 000 | 0 | r | The character(s) is(are) a root character(s) to be added to preceding characters |
| 010 | 2 | −rr | Clear the last root buffer, add the character(s), but the result is not a word |
| 101 | 5 | −rx | Clear the specified number x of root buffers |

TABLE D 5-bit Character Code

| a 00000 | b 00001 | c 00010 | d 00011 | e 00100 |
|---|---|---|---|---|
| f 00101 | g 00110 | h 00111 | i 01000 | j 01001 |
| k 01010 | l 01011 | m 01100 | n 01101 | o 01110 |
| p 01111 | q 10000 | r 10001 | s 10010 | t 10011 |
| u 10100 | v 10101 | w 10110 | x 10111 | y 11000 |
| z 11001 | | | | |

| 11010 | Additional control b-codes when combined with |
| 11011 | the eight, 3-bit b-codes produces 48 extra |
| 11100 | control codes available for further information |
| 11101 | reduction, for example, for common suffixes |
| 11110 | such as "tion," "tive," etc. |
| 11111 | |

To code the information in Table B from the word list of Table A requires the mnemonics of Table C.

Then the mnemonics and characters of Table B are digitally coded using Table C for the first three bits (the b-code) and Table D for the last five bits. Thus, the 8-bit code for "r f" in Table B will be 00000101. For "r a", 00000000; for "rw ble", 10000001 (rw "b"), 11101011 (intermediate character "l") and 11100100 (intermediate character "e"). The remainder of Table B is coded in a similar manner and the 8-bit codes stored in memory. For the special case of —rx, where "x" represents a number 0 through 9, the 5-bit character code for "x" will be represented as shown in Table E.

TABLE E

Special Case Character Code for b-Code —rx

| | |
|---|---|
| 0 | 10000 |
| 1 | 10001 |
| 2 | 10010 |
| 3 | 10011 |
| 4 | 10100 |
| 5 | 10101 |
| 6 | 10110 |
| 7 | 10111 |
| 8 | 11000 |
| 9 | 11001 |

The effect of the tables and bit manipulations is to minimize the need to repeat similar information. For example, to store the first two words in Table A, the letters "fa·ble" need only be stored once. The letter "d" (and the b-code) is the only information necessary to represent the second word. Therefore, out of a total of 13 pieces of information only 7 need to be stored in memory and will represent both the words "fa·ble" and "fa·bled".

As the list continues, i.e., "fab·ric," "fab·ri·cate," etc., the redundancy becomes cumulative resulting in increased memory space savings. The b-code rules are explained in further detail below in conjunction with the vocabulary reconstruction process.

Vocabulary Reconstruction

Assume a user desires to know the spelling and syllabic breaks within a target word "fabrication." A unique feature of the spelling device is that it allows the user to take a best guess at the possible spelling of the target word and then display the exact word or words closest to the target word guess. For example, the user may enter "fabr" because this is as much as he feels is an accurate guess for the word "fabrication." The spelling device, in response, displays a table of the words closest to the spelling of the user's guess. For the vocabulary of Table A, the display will show the following:
 fab·ric
 fab·ri·cate
 fab·ri·cat·ed
 fab·ri·cat·ing
If the target word is not shown in the display, the user by depressing the scroll keys shown in FIG. 1 may scroll the display upward,

| |
|---|
| fab·ri·cate |
| fab·ri·cat·ed |
| fab·ri·cat·ing |
| → fab·ri·ca·tion ← | where the target word is found, or downward,
 fab·ric
 fab·ri·cate
 fab·ri·cat·ed
 fab·ri·cat·ing and downward again,
 fa·bled
 fab·ric
 fab·ri·cate
 fab·ri·cat·ed
to examine similar spelling choices. Of course, the display may actually show more than 4 words, with the actual number dependent upon the commercially available liquid crystal or other display employed.

In the preferred embodiment, in the memory for the vocabulary reconstruction nine root buffers and one word buffer are used. The first root buffer stores only a single byte while the eight subsequent root buffers each store up to 20 bytes. The word buffer is also 20 bytes.

Following entry of the users best guess, the spelling device examines the guess "fabr," and using the first character (or more) of the guess, "f," finds the base code for words stored in memory that start with the letter "f". (The manner in which base codes are used is described below.) For illustrative purposes Tables A, B and C will be used in the following word building process.

Because the first character in the target word guess is "f," the spelling device seeks the memory location that contains the information of vocabulary words beginning with "f," i.e., Table B. The first entry in Table B, [r f], indicates that "f" is a root character and should be stored in the root buffer. Therefore, the buffer will contain:

| Root Buffer Number | |
|---|---|
| 1 | f |
| 2 | |
| 3 | |
| Word Buffer | |

The spelling device attempts to match the target word guess "fabr" with "f". No match is made so the search process continues.

The next entry, [r a], is also a root character and is stored as follows:

| Root Buffer Number | |
|---|---|
| 1 | f |
| 2 | a |
| 3 | |
| Word Buffer | |

Again, the target word guess "fabr" does not match with "fa" so the search continues.

The next entry, [rw ⁀ ble] from Table C, is a root set of characters and is, additionally, a word. Therefore, the buffers will contain:

| Root Buffer Number | |
|---|---|
| 1 | f |
| 2 | a |
| 3 | . b l e |
| Word Buffer | |

Because a dictionary word is complete, the system sends data to the display, as shown.
 fa·ble
Again, no match with the target word "fabr" has been made so the search process continues.

The fourth entry, [w d], is classified as only a word character and is thus loaded into the word buffer.

| Root Buffer Number | |
|---|---|
| 1 | f |
| 2 | a |
| 3 | . b l e |
| Word Buffer | d |

Because the b-code indicated that with the addition of "d," a dictionary word was created, the contents of the buffers are displayed:
 fa·ble
 fa·bled
Again, no match is made with the target word guess "fabr" and the search process continues.

The fifth entry, [—rr b], indicates that "b" is a root character and that the last root buffer entry should be deleted and replaced with the new root character "b". In addition, the word buffer is cleared. Hence,

| Root Buffer Number | |
|---|---|
| 1 | f |
| 2 | a |
| 3 | b |
| Word Buffer | |

The display is not revised because the new information is not classified as a word. Again, no match was made between the target guess word "fabr" and the buffer contents; therefore, the search continues.

The sixth entry, [r ^ ri], is classified as a root set of characters. The buffer update then becomes

| Root Buffer Number | |
|---|---|
| 1 | f |
| 2 | a |
| 3 | b |
| 4 | . r i |
| Word Buffer | | and no display update is required.

This time a match of the buffer contents "fabri" is made with the target guess word "fabr" so the search process ceases. The spelling device then fills the remaining portion of the display with the immediately following words. The sequence will be:
Entry 7, [w c].

| Root Buffer Number | |
|---|---|
| 1 | f |
| 2 | a |
| 3 | b |
| 4 | . r i |
| Word Buffer | c | displaying
 fa·ble
 fa·bled
 fab·ric
Entry 8, [r ^ ca],

| Root Buffer Number | |
|---|---|
| 1 | f |
| 2 | a |
| 3 | b |
| 4 | . r i |
| 5 | c a |
| Word Buffer | | with no display revision.
Entry 9, [r t],

| Root Buffer Number | |
|---|---|
| 1 | f |
| 2 | a |
| 3 | b |
| 4 | . r i |
| 5 | . c a |
| 6 | t |
| Word Buffer | | with no display revision.
Entry 10, [w e],

| Root Buffer Number | |
|---|---|
| 1 | f |
| 2 | a |
| 3 | b |
| 4 | . r i |
| 5 | . c a |
| 6 | t |
| Word Buffer | e | displaying
 fa·ble
 fa·bled
 fab·ric
 fab·ri·cate
Entry 11, [w ^ ed],

| Root Buffer Number | |
|---|---|
| 1 | f |
| 2 | a |
| 3 | b |
| 4 | . r i |
| 5 | . c a |
| 6 | t |
| Word Buffer | . e d | displaying
 fa·bled
 fab·ric
 fab·ri·cate
 fab·ri·cat·ed
Entry 12, [w ^ ing],

| Root Buffer Number | |
|---|---|
| 1 | f |
| 2 | a |
| 3 | b |
| 4 | . r i |
| 5 | . c a |
| 6 | t |
| Word Buffer | . i n g | displaying
 fab·ric
 fab·ri·cate
 fab·ri·cat·ed fab·ri·cat·ing

The spelling search is now complete. The target word "fabrication" is not displayed. The user may now scroll the display up or down to continue searching for the exact spelling of the target word. Scrolling the display upward calls the next entry, 13, [−rr ⁕ ti].

| Root Buffer Number | |
|---|---|
| 1 | f |
| 2 | a |
| 3 | b |
| 4 | . r i |
| 5 | . c a |
| 6 | . t i |
| Word Buffer | | and 14, [w on],

| Root Buffer Number | |
|---|---|
| 1 | f |
| 2 | a |
| 3 | b |
| 4 | . r i |
| 5 | . c a |
| 6 | . t i |
| Word Buffer | o n | displaying the desired correct spelling and syllabic breaks of the target word "fabrication".

| | |
|---|---|
| | fab·ri·cate |
| | fab·ri·cat·ed |
| | fab·ri·cat·ing |
| | → fab·ri·ca·tion ← |

The hypothetical vocabulary reconstruction example is complete. To clarify the use of the remaining [−rx] and [−rw] b-codes, the above reconstruction process is continued below through entry 18, [rw ⁕ u ⁕ lous] of Table B.

Proceeding with Entry 15, [w ve],

| Root Buffer Number | |
|---|---|
| 1 | f |
| 2 | a |
| 3 | b |
| 4 | . r i |
| 5 | . c a |
| 6 | . t i |
| Word Buffer | v e | displaying
fab·ri·cat·ed
fab·ri·cat·ing
fab·ri·ca·tion
fab·ri·ca·tive

Entry 16, [−rw ⁕ tor], indicates that the new characters are both a root and a word, and, additionally, to replace the last root entry with the current new information; hence,

| Root Buffer Number | |
|---|---|
| 1 | f |
| 2 | a |
| 3 | b |
| 4 | . r i |
| 5 | . c a |

-continued

| Root Buffer Number | |
|---|---|
| 6 | . t o r |
| Word Buffer | |

Because this new data is classified as a vocabulary word, the b-code causes the display to be revised,
fab·ri·cat·ing
fab·ri·ca·tion
fab·ri·ca·tive
fab·ri·ca·tor Entry 17, [−r3], requires that the last three root buffers be cleared. Therefore,

| Root Buffer Number | |
|---|---|
| 1 | f |
| 2 | a |
| 3 | b |
| 4 | |
| 5 | |
| 6 | |
| Word Buffer | | and the display is not revised.

Entry 18, [rw⁕ u ⁕ lous], is both a root and a word. The buffers and display updates are thus:

| Root Buffer Number | |
|---|---|
| 1 | f |
| 2 | a |
| 3 | b |
| 4 | . u . l o u s |
| 5 | |
| 6 | |
| Word Buffer | | displaying:
fab·ri·ca·tion
fab·ri·ca·tive
fab·ri·ca·tor
fab·u·lous

FIG. 2 is a flowchart illustrating a preferred technique for encoding vocabulary words into binary digits for storage and later recall. The process enters the flowchart at block 10 at which four flags—HAT (syllabic break), DELAY (exchange syllabic break and first letter), BFIRST (first letter) and BCENT (b-code entered) are all set to 0. A character is then read in, and at block 20 examined to determine whether it is a line feed or carriage return. If so, the four flags are reinitialized to 0 at block 25 and the next character read in. If the character read in is not a line feed or carriage return, control passes to block 30 where a test is performed to determine whether the b-code has been entered. If the b-code has not been entered, i.e., flag BCENT is equal to 0, the character is tested by blocks 40-45 to select the proper b-code. For example, if the character is an r, a b-code of 000 is assigned at block 52. Control of the program is then passed to block 56 at which flags BFIRST and BCENT are each set equal to 1. Block 46 prints a b-code error message in the event that the b-code has been entered, yet does not match any of the permissible b-codes 40-45. Of course, the number of b-codes 40-45 may be increased or decreased as desired to create any desired set of b-codes. Once the b-code test is complete at block 56, program control returns to read in another character at block 10. The flags are not reinitialized.

Because block 56 will have set flag BCENT to be 1, the second pass through the flowchart will result in the test performed at block 30 being true, and accordingly control will pass to block 60. At block 60 a test is performed to determine whether the character is a circumflex (^), used to designate a syllabic break in a word. If not, a test is performed at block 70 to determine whether this is the first character after the b-code. If not, control passes to block 80 where a test is performed with regard to whether the HAT flag is equal to 0. If so, the character entered in block 10 is added to binary 11100000 and the result stored as specified by block 90.

The purpose of the remaining portions of the flowchart, that is, to the right-hand side of blocks 60 and 70 and to the left-hand side of blocks 80 and 90, is to further compact the information received by switching the order of the syllabic break symbol and the first non-b-code character. In this manner the three most significant bits of each 8-bit binary word will be devoted to either b-code or a circumflex, and the next five bits will be devoted to a binary representation of the character. Without switching the order, memory space would be wasted as whenever a syllabic break followed a b-code entry, for example, as shown in the third line of Table B, the first binary word would have no content beyond the b-code.

Returning to block 60, if the circumflex is detected, control of the program passes to block 61 where the HAT flag is set equal to its previous value plus 1. At block 62 a determination is made as to whether BFIRST is equal to 0 or 1. If BFIRST is 0, that is, this is not the first letter, then control returns to block 10 and another character is read. On the other hand, if the BFIRST test at block 62 is positive, the delay flag is set equal to 1 at block 63 and the next character read in.

Block 70 performs a test as to whether the BFIRST flag is equal to 1 or 0. If it is equal to 1, then the BFIRST flag is reset to be 0, and the temporary character and b-code are added together and stored at block 71.

If at block 70 the BFIRST flag is 0 and the HAT flag is not 0 at block 80, then control passes to block 81 where a test is made to determine whether the delay flag is equal to 1. If not, it is set equal to 1 at block 82 and the temporary character is added to the binary 11100000 and stored as shown at block 90.

If the delay is equal to 1 at block 81, then at block 83 the HAT flag is reduced by 1 and a test performed at block 84 to determine whether it is now 0. If so, the delay is set equal to 0 at block 85 and control passes to block 86. If the HAT flag was not 0 at block 84, control passes directly to block 86 and the temporary character is added to the HAT character and stored. The temporary character buffer, HAT character buffer and b-code buffer are shown schematically in the left-hand corner of FIG. 2.

FIG. 3 is a flowchart illustrating the reconstruction technique by which an 8-bit binary word is reconstructed into a vocabulary word and displayed on the screen as necessary. As shown in FIG. 3 control enters at block 100 where initialization is performed in which the print, root, and rtctr are each set equal to 0. The rtctr flag points to the appropriate root buffer. The print flag controls whether a particular character is displayed, while the root flag controls whether the decoded character is the root of a word. At block 110 the character is retrieved and a test performed at block 120 to determine whether the retrieved character is an intermediate one, that is, carries a b-code of 111. If it is, control passes to block 130 which calls the subroutine of FIG. 3A, then loads a new character into the second temporary buffer at step 140. Control then returns to block 110 and the next character is retrieved. Assuming the next character is not an intermediate one, control will pass to block 150 to determine whether the next character is a circumflex, indicative of a syllabic break. If so, block 160 is called to determine whether the root flag is 1. If the root flag is not 1, the contents of temporary buffers TEMP1 and TEMP2 are loaded into the word buffer at step 170. If on the other hand the root is equal to 1, the contents of temporary buffers 1 and 2 are loaded into the rtctr buffer at step 171.

If at step 150 a syllabic break circumflex is not detected, control will shift to the tests performed by blocks 180–185. These blocks test the character to determine whether it is a b-code character, and if so, transfer control to one of blocks 190–195 for appropriate action. Block 190 will call the subroutines of FIGS. 3A and 3B, then set the root flag to 0. In a similar manner each of the blocks 191–195 performs the steps shown therein.

The subroutines called by blocks 190–194 are shown in detail in FIGS. 3A–3C. The subroutine of FIG. 3A simply tests to determine whether the root flag is 1. If it is, then the contents of buffer TEMP2 are loaded into the rtctr buffer. If the root flag is not equal to 1, then the contents of TEMP2 are loaded into the word buffer.

FIG. 3B tests the state of the print flag. If the print flag is on, the word string is printed, i.e., displayed on the screen, while if the print flag is off, it is turned on.

FIG. 3C also tests the status of the print flag, and if it is found to be on, prints the word string on the screen, and if it is found to be off, maintains it off.

FIG. 4 is a block diagram of the circuitry of one embodiment of the hand-held spelling checker of this invention. As shown in FIG. 4, the main portion of the system is a microprocessor, in the preferred embodiment, a Zilog Z80 CMOS microprocessor 200. A data bus 210 couples microprocessor 200 to a read only memory 220 in which the program of FIGS. 2 and 3 is stored. In the preferred embodiment the program ROM is a 27C32. The data bus 210 also connects the microprocessor to a scratchpad random access memory, preferably an HM6116, used as temporary storage for the buffers described in FIGS. 2 and 3. Each of the program ROM 220 and the scratchpad random access memory 230 are also connected to the address bus 240 to receive addressing information from the microprocessor. The vocabulary of the system is stored in one or more dictionary ROMs 250 coupled between the data and the address buses. In one embodiment of the invention, the dictionary ROM consists of two 27C64 ROMs, although larger single ROMs may be employed as semiconductor technology advances.

A keyboard 260 is connected to supply addressing information on bus 240 and through a keyboard interface 270 to the data bus 210. In the preferred embodiment the keyboard interface is a CD4503B, while the keyboard, as shown in FIG. 1, consists of 26 keys corresponding to the letters of the alphabet, together with scroll up and scroll down keys, and a reset key. A latch 280, preferably a CD4070B, is connected between the keyboard and the data bus. A display 290 is connected to the data bus and to the microprocessor. In the preferred embodiment the display is a liquid crystal display LM041L. A multiplexer 300 coupled to the address bus and to the microprocessor selects among the ROM and RAM devices, as well as latch 280 and display 290 to activate the proper chip in response to control signals from the microprocessor 200. The microprocessor is also connected to receive clock signals from clock 310 and to receive power from a power supply 320 driving the microprocessor through a voltage regulator 330. Also in the preferred embodiment, a power on reset circuit 340 is provided. The random access and read-only memory have been shown in FIG. 4 as external to the microprocessor. It should be appreciated, however, that if adequate RAM and ROM are provided within the microprocessor itself, the separate devices will not be necessary.

Preclassification for Speeding the Search Process

In many instances the search time required to find a specific piece of information in a large memory is slow. This nonreal-time operation annoys a user and defeats the purpose of an instant information retrieval system. Further, limitations of integrated circuit technology causes longer than desired buffer and logic processing propagation delay times. In the circuit diagram of FIG. 4, CMOS components were used to lower power consumption, but this required a slower clock speed (1 MHz as opposed to 32 MHz). To compensate for this power versus speed trade-off, a search preclassification scheme is employed. This allows the circuit of FIG. 4 to maintain a real-time search quality while taking advantage of the minimum power consumption properties afforded by the CMOS technology. Because speed is of utmost importance the preclassification scheme is variable and can operate on one to any number of preclassification characters.

Without preclassification, if a user were to enter "deter" to search for the target word "determine," a search starting from the letter "a" through "determine" would begin. Throughout the process approximately 10,400 syllabicated words or approximately 124,800 characters would be scanned and the system would converge on the search entry, "deter," approximately 6 minutes later. To prevent this long wait, the search entry is placed in a buffer and sequentially compared (exclusive ORed) to the preclassification memory entry points, termed PMEP herein. For example, the first character of the search entry "d" is compared to the first character PMEP of Table F. The second character is scanned in the same manner and the PMEP is "de." A third character is available in the PMEP so the final match between the user search entry "deter" is "det." From Table G, the target word search would start at address location 24588. The results of this yield a search, for example, from "detach" through "detect," "detergent" and ultimately to "determine."

The search time for the preclassification scheme is comparatively much faster than a sequential search and restores the information retrieval system to real-time operation, even with the CMOS maximum clock speed lowered to 1 MHz.

The actual number of characters used in the preclassification comparison is redefinable by the designer and dependent upon the type of information that was stored for retrieval. For example, in the speller described in FIG. 4, it was desired to not scan more than approximately 256 words, so the PMEP of Table H is employed. In cases where more resolution was needed, for example, words beginning with "un," four characters were required to stay within the 256 word limit.

TABLE F

Fast Search Preclassification Scheme
Search Character

1st     2nd     3rd ... etc.

a
b
c
d
e
f
g
h
i
.
.
.
z

TABLE G

Preclassification Memory Entry Points
for Word Search Category "d"

| Preclassification | Address |
|---|---|
| da | 23000 |
| de | 23050 |
| def | 23199 |
| den | 23471 |
| det | 24588 |
| di | 24723 |
| dip | 25000 |
| dij | 25311 |
| dit | 25398 |
| do | 25702 |
| dr | 25943 |
| du | 26333 |

TABLE H

Preclassification Entry Points

| | | | | |
|---|---|---|---|---|
| a | dip | inep | per | sto |
| ac | disj | inh | ph | stri |
| ad | dist | inst | pi | su |
| ag | do | inter | pl | suc |
| al | dr | intr | po | sun |
| am | du | io | pos | sur |
| an | | | pr | sv |
| ao | ea | ja | prel | sy |
| ar | eg | jo | prin | |
| as | em | | pron | ta |
| at | en | ka | ps | tap |
| | enm | | pu | te |
| ba | eo | la | | ten |
| ban | es | lar | qu | th |
| be | ex | le | | ti |
| bem | exp | li | ra | to |
| bi | ey | ll | re | tr |
| bl | | lu | reco | trap |
| bo | fa | | refr | trig |
| br | fe | ma | rem | ts |
| bu | fi | mam | res | |
| | fl | mas | rh | ub |
| ca | fo | me | ro | un |
| can | fr | mer | ru | unco |
| cas | fu | mi | | undi |
| ce | | mis | sa | uni |
| ch | ga | mo | san | unr |
| chi | ge | mons | sc | up |
| ci | gi | mu | sco | |
| co | go | | se | va |
| com | gr | na | sei | ve |
| con | gu | ne | sen | vi |
| cons | | no | sh | vo |
| conv | ha | nu | shi | |
| cos | he | | si | wa |
| cr | hi | oa | sk | we |

TABLE H-continued

| Preclassification Entry Points | | | | |
|---|---|---|---|---|
| cu | ho | od | sm | wi |
|    | hu | on | so | wo |
| da | hy | os | som |   |
| de |    | ov | sp | xe |
| def | ia |   | spu |   |
| den | im | pa | sq | ya |
| det | in | par | st |   |
| di | incr | pe | ste | za |

Further Applications

The method for reducing redundant information described herein has many applications of which one sequential search speller checker has been described. There are, however, numerous other applications. For example, using the same b-coding and sub-coding techniques, described previously, sequential data such as telephone books, charge card listings, card catalogs, etc., can be reduced equivalently.

Random text information can also be more compactly stored. The benefits of reducing the amount of redundant information in random text can be better appreciated if applications to knowledge based systems are considered. For example, a typical memory system, silicon, magnetic floppy diskette, hard single or multi-plattered disk, optical laser, or other memory device can store the equivalent of approximately four times the amount of information that would be stored using state-of-the-art techniques. Thus, a 10 Mbyte hard disk drive would appear as a ~40 Mbyte drive, etc. Therefore, concern over storing memory intensive on-line databases such as system manuals, accounting, directories, encyclopedias, medical patient histories, law code books, or inventory lists is minimized by a multiple factor of the storage medium capacity. Further, redundancy reduction minimizes the cost of purchasing mass storage medium for use in archival storage or system back-ups by a factor of ~4 to 1. Whereas the conventional technique stores each character and control character as an ASCII byte, the method of this invention as applied to random text assigns two bytes to each word that correspond to the address of the applicable word in a dictionary itself stored using the method described above. The use of two bytes allows $2^{16}$ or 65,536 vocabulary words. Control characters are stored as single bytes and spaces between words, if authorized, are automatically inserted after each two-byte boundary. For example, careful selection of the single byte code is necessary to avoid introducing ambiguities in the word table.

TABLE I

Common Words Listed in Order of Highest Frequency of Occurrence

| | | |
|---|---|---|
| 1. the | 10. it | 19. by |
| 2. of | 11. for | 20. but |
| 3. and | 12. as | 21. have |
| 4. to | 13. with | 22. you |
| 5. a | 14. was | 23. which |
| 6. in | 15. his | 24. are |
| 7. that | 16. he | 25. on |
| 8. is | 17. be | 26. or |
| 9. I | 18. not | 27. your |

TABLE J

Two-Byte Word Assignments for the Dictionary

| Word No. | Byte1 | Byte2 | Word |
|---|---|---|---|
| 1 | 00000001 | 00000001 | aard·vark |
| 2 | 00000001 | 00000010 | a·back |
| 3 | 00000001 | 00000011 | ab·a·cus |
| 4 | 00000001 | 00000100 | ab·a·cus·es |
| ⋮ | ⋮ | ⋮ | ⋮ |
| 212 | 00000001 | 11010100 | |
| 213 | 00000010 | 00000000 | |
| 214 | 00000010 | 00000001 | |
| 215 | 00000010 | 00000010 | |
| ⋮ | ⋮ | ⋮ | ⋮ |
| 44,943 | 11010100 | 11010011 | zwie·back |
| 44,944 | 11010100 | 11010100 | zy·gote |

Each byte was only permitted to represent the binary codes 1 through 212. As a result, 212×212, or 44,944 words are available for the dictionary, and the remaining codes, 0 and 213–255 are available for 44 common words, punctuation marks, tabs, spaces, carriage returns, etc.

A two- (or more if necessary) byte word identification scheme can represent $2^{16}$ or 65,536 words. However, the two bytes cannot address the 115,000 bytes of memory needed to store the data in the manner described above in conjunction with Tables C and D. This is because there is no correlation between the two-byte word number and the appropriate word storage location in memory. The problem is amplified if the redundancy reduction technique is not used on the 45,000 word dictionary since the two bytes, 65,536 addressable locations, cannot address the 540,000 byte unreduced dictionary memory.

This problem, however, may be solved using the

| | Never | address | your | marketplace | universally. | |
|---|---|---|---|---|---|---|
| ASCII | 5 + | 1 + 7 + | 1 + 4 + | 1 + 11 + | 1 + 11 + | 1 = 43 bytes |
| Redundancy Reduction | 2 + | 2 + | 2 + | 2 + | 2 + | 1 = 11 bytes | produces a 3.9:1 memory reduction.

A two-byte word representation was used in the above examples and further efficiency was maintained for single character items such as periods, commas, spacing control characters, etc. In addition and of particular importance are a set of words that have a high frequency of occurrence in common text. These are listed in Table I and because of their repetitive appearances, it was appropriate to assign these words a special single byte code. Therefore, in selecting the word code translation table, certain single byte representations are reserved. Because reserving a single byte code affects both the low and high byte of the two-byte word code, technique shown in FIG. 5 by examining and counting only the word b-codes "rw", "−rw" and "w." In doing so, regardless of how large the dictionary memory is, the two bytes can address up to 65,536 words. Use of this technique can be seen in Table B, in which 18 words are listed among 28 total entries. In this example, the system scan enters at the first memory location, examining each successive location for a word b-code. Each time a "w" or "rw" is detected, the count is compared to the two-byte target word number. When the word count matches with the word number buffer value, the word is reconstructed and printed to the appropriate output device. To reduce the redundancy of character spacing within the text, rules were established where all single and two-byte words were to be automatically preceded by a space except when followed by a period. In this case the system inserts a space and has the first character of the word represented in uppercase.

This unique two-byte (or more) encoding and decoding scheme can also be applied to other than redundance-reduced text by counting and matching the two-byte word number with the number of carriage return (CR) line feed (LF) character pairs detected at the end of each dictionary word. The result would yield similar text storage space savings; however, since the dictionary word not be used an extremely large amount of text would have to be applied before the text storage space savings would equal the space needed to initially store the dictionary.

Both (1) sequential text information redundancy reduction and (2) random text information redundancy reduction may be combined to increase the transmission speed in a data communications connection. To establish a communications link, both ends require a data reduction encoder for transmitting, and a decoding data expander for receiving. A typical system is shown in FIG. 6.

Because the data can be reduced by a ratio of approximately 4 to 1, the transfer of reduced data over a communications link results in an increase in the effective rate of data transfer, even though the actual information transfer rate expressed in bits per second remains the same. This has a two-fold advantage in that it allows a data processing center to minimize its costly data communications transmission connect time and in effect, permits transmitting at a higher data rate without the cost of upgrading to high speed data communications equipment.

Data encryption is an added benefit of the data reduction techniques described above. In typical schemes encryption keys are used to encipher information from viewing by unauthorized personnel. To make it sufficiently difficult to discover the key envryption code, longer key sequences have been proposed. This solution does much to protect valued information; however, it trades off increased difficulty in code decipherability with reduced data transmission speed and reduced encryption/decryption throughput by the host transmitting/receiving computer. Typically, long encryption keys provide data protection for those computers having significant processing speeds to decipher the coded information in a timely fashion. This eliminates many small systems or businesses that have as confidential information but cannot afford the cost of a high-speed numerical processor to protect data. Furthermore, the methods used by those attempting to break such encrypted data have at their access the useful statistical information about English or other appropriate grammar. For example, to decipher a document one begins by examining statistics on the frequency of occurrence of letters, diagrams, trigrams and words.

Thus, in deciphering one would count the highest number of occurrences of a given symbol and assign that particular symbol the letter "e." Substituting "e" for the highest symbol occurrence, "t" for the next highest symbol occurrence, examining the text for intelligibility, and repeating the process for each successive letter, digram, trigram, etc., would eventually yield the decipheror enough information to determine the content of the encrypted information. Of course, these are over simplified examples of the code breaking process. They do, however, point out the reason for a trend toward longer and more complex encryption keys which, unfortunately, strains or limits the throughput of the data communications equipment.

The redundancy reduction techniques described above are unique to solving this throughput versus encryption complexity dilemma because the coding process is multi-leveled and, more importantly, operates on whole words. Though word histograms can be generated, their statistics, unlike the constant nature of letter, digram and trigram statistics, remain highly unstable because of their dependency on the subject matter of the encoded message. Further, an exact code is necessary to decipher each word since a word cannot be broken down into or correlated by letter elements. For example, knowing the code that represents the word "three" has no relation to the word "therefore" and exemplifies the orthogonal nature of each coded word.

One technique for encryption is to use a sequence of transformations. First a dictionary is compiled as a database specific dictionary that is pseudo-sequentially-random ordered or randomly ordered. This sets up the first layer of enciphering that performs the multi-functions of reducing, coding and encrypting the text. Next a single- or double-byte word representation similar to that described in Table J is employed. These bytes perform the dual role of enciphering and representing the word table count sequences. Viewing these codes, an intruder gains no information as to the content of the encrypted text. Next the bytes may be scrambled as desired to provide an additional layers of encryption protection. Essential to understanding the encryption scheme is the realization that, without the reference dictionaries, it is meaningless to intercept the transmitted single- and dual-byte codes.

The foregoing has been a description of the preferred embodiment intended to explain the invention. The scope of the invention may be ascertained from the appended claims.

I claim:

1. A spelling checker comprising:
   data entry means for entering letters of at least part of a word;
   data processing means coupled to the data entry means for receiving data indicative of the letters entered therefrom;
   program storage means coupled to the data processing means for controlling the data processing means;
   display means coupled to the data processing means for displaying information therefrom; and
   dictionary storage means coupled to the data processing means for storing words to be displayed on the display means in response to the letters entered, the dictionary storage means storing a sequence of entries consisting of a first plurality of bits of information indicative of one of a set of operations to be performed by the data processing means and a second plurality of bits representing a particular character to be operated on by the data processing means;
   the data processing means comprising means responsive to the first plurality of bits for performing the indicated operation by operating upon the second plurality of bits.

2. A spelling checker as in claim 1 wherein the data entry means comprises a keyboard, the data processor means comprises a microprocessor, the program storage means comprises a semiconductor memory, and the dictionary storage means comprises a semiconductor memory.

3. A spelling checker as in claim 1 wherein the first plurality of bits comprises three bits and a second plurality of bits comprises five bits.

4. A spelling checker as in claim 1 further comprising:
temporary data storage means coupled to the data processing means for storing characters, the temporary data storage means including a plurality of root buffers and a word buffer.

5. A spelling checker as in claim 4 wherein the data processing means comprises:
means for retrieving, in response to the at least part of a word entered from the data entry means, an entry from the dictionary storage means; and
means responsive to a predetermined pattern of the first plurality of bits in the retrieved entry for storing the second plurality of bits in the retrieved entry in a selected one of the root buffers or the word buffer.

6. A spelling checker as in claim 5 wherein the display means comprises means for operating under control of the first plurality of bits in the retrieved entry to display a word from the dictionary storage means.

7. A spelling checker as in claim 5 wherein the data processing means further comprises means responsive to a predetermined pattern of the first plurality of bits in the retrieved entry for storing in a selected one of the root buffers or the word buffer the second plurality of bits in the retrieved entry, and for displaying a word on the display means.

8. A spelling checker as in claim 5 wherein the data processing means further comprises means responsive to a predetermined pattern of the first plurality of bits in the retrieved entry for clearing a root buffer and for storing the second plurality of bits in the retrieved entry in a root buffer and for displaying a word on the display means.

9. A spelling checker as in claim 1 wherein the dictionary storage means comprises read only memory means.

10. A spelling checker as in claim 9 wherein the dictionary storage means comprises a plurality of read only memory means, a selected one of which is coupled to the data processing means.

11. A spelling checker comprising:
data entry means for entering letters of at least part of a word;
data processing means coupled to the data entry means for receiving data indicative of the letters entered therefrom;
program storage means coupled to the data processing means for controlling the data processing means;
display means coupled to the data processing mans for displaying information therefrom;
dictionary storage means coupled to the data processing means for storing words to be displayed on the display means in response to the letters entered, the dictionary storage means storing a sequence of entries consisting of a first plurality of bits of information indicative of one of a set of operations to be performed by the data processing means and a second plurality of bits representing a particular character to be operated on by the data processing means; and
a plurality of buffers coupled to the data processing means;
the data processing means comprising means for retrieving, in response to the letters entered from the data entry means, an entry from the dictionary storage means; and means for storing, under control of the first plurality of bits in the retrieved entry, the second plurality of bits in the retrieved entry in a selected one of the plurality of buffers.

12. A method of compactly storing dictionary entries in the memory of a data processing system comprising:
alternately entering a pair of characters for a letter in a word to be stored, the pair consisting of the letter to be stored and a code indicative of the relationship between an earlier letter stored and the letter to be stored;
detecting whether the character entered is a letter in a word to be stored or the character is a code indicative of the relationship between an earlier letter entered and a letter to be subsequently entered;
if the character entered is a code, then assigning one of a first set of binary values to the character, and if the character is a letter in a word, then assigning one of a second set of binary values to the character;
for each pair of characters entered, combining the first set of binary values and the second set of binary values to thereby provide a combined binary value; and
storing the combined binary value in the memory of the data processing system.

13. A method as in claim 12 wherein the step of assigning one of a second set of binary values to the character comprises the step of assigning the low-order bits of the ASCII binary value for the letter entered.

14. A method as in claim 12 wherein the step of assigning one of a first set of binary values to the character comprises the step of assigning a set of binary values indicating that the following character is an intermediate character in a word.

15. A method as in claim 12 wherein the step of assigning a first set of binary values to the character comprises the step of assigning a set of binary values indicating that the following character follows a syllabic break.

16. A method as in claim 12 wherein the step of assigning a first set of binary values to the character comprises the step of assigning a set of binary values indicating that with the addition of the character represented by the second set of binary values a word is created.

17. A method as in claim 12 wherein the step of assigning a first set of binary values to the character comprises the step of assigning a set of binary values indicating that the character represented by the second set of binary values is a root character and completes a word.

18. A method as in claim 12 wherein the step of assigning a first set of binary values to the character comprises the step of assigning a set of binary values indicating that the letter represented by the second set of binary values is a root letter to be added to preceeding letters.

19. A method as in claim 12 wherein the step of assigning a first set of binary values to the character comprises the step of assigning a set of binary values indicating that a previous root character is to be deleted and the letter represented by the second set of binary values is to be added and that the resulting characters form a word.

20. A method as in claim 12 wherein the step of assigning a first set of binary values to the character comprises the step of assigning a set of binary values indicating that a last root buffer is to be cleared and the letter represented by the second set of binary values is to be added to the remaining letters.

21. A method as in claim 12 wherein the step of assigning a first set of binary values to the character comprises the step of assigning a set of binary values indicating that a specified number of root buffers is to be cleared.

* * * * *